United States Patent Office 3,305,095
Patented Feb. 21, 1967

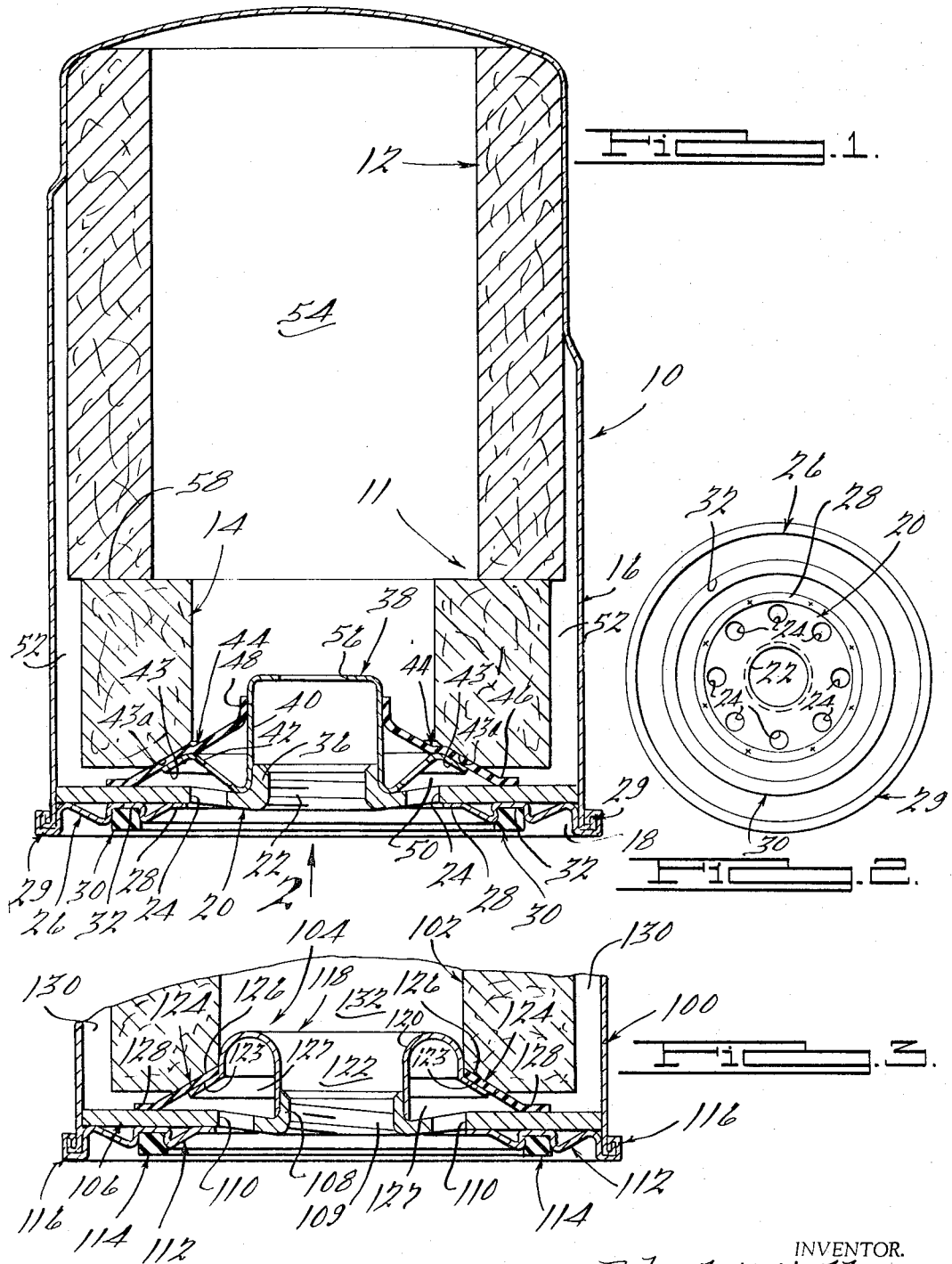

3,305,095
FILTER HAVING A FLAT RESILIENT DISC SERVING AS BOTH A RELIEF AND CHECK VALVE
Robert K. Hathaway, Racine, Wis., assignor to Walker Manufacturing Company, Racine, Wis., a corporation of Delaware
Filed June 11, 1964, Ser. No. 374,383
6 Claims. (Cl. 210—130)

This invention relates generally to fluid filters and, more particularly, to disposable oil filter units for automotive or similar type internal combustion engines. The invention is related to the invention disclosed and claimed in U.S. Patent No. 3,083,832 and is a continuation-in-part of my copending application, Serial No. 147,552 filed October 25, 1961, and now U.S. Patent No. 3,146,194.

It is an object of the invention to provide a simplified valve assembly for a throwaway or disposable oil filter unit.

It is another object of the present invention to provide an oil filter unit having a valve element that provides the threefold function of seal, check valve, and relief valve.

It is also an object of the invention to provide a valve element that acts as a seal which conforms itself to the surfaces being sealed.

The invention accomplishes the above and other objects by a construction in which an annular flexible valve disc is gripped around an intermediate diameter to form a seal with its outer and inner peripheries being flexible to act as check and relief valves.

The invention is illustrated in the accompanying drawings wherein:

FIGURE 1 is a longitudinal sectional view of the filter of the present invention;

FIG. 2 is a bottom elevational view of the structure illustrated in FIG. 1, taken in the direction of the arrow 2 thereof; and FIG. 3 is a fragmentary sectional view of an alternative embodiment of the valve assembly illustrated in the filter of FIG. 1.

Referring now to FIG. 1, the oil filter 10 includes a filtering medium 11 formed by a pair of hollow cylindrical filter elements 12 and 14 enclosed within an inverted cup-shaped casing or housing 16. These filter elements are preferably sufficiently rigid to provide relatively high column strength such that an axial compressive load may be applied thereto. The filter housing 16 is provided with a lower open end 18 in which is disposed a relatively heavy gauge reinforcing plate 20 having a central outlet passage 22 and a plurality of circumferentially spaced inlet ports 24 formed radially outward from the outlet passage. The reinforcing plate 20 is secured within the open end 18 of the housing 16 by an annular base plate 26 which is connected at its radial inner edge portion 28 to the reinforcing plate 20 by the spotwelding x illustrated in FIG. 2, and is connected to the lower end of the housing 16 in a fluid-tight roll seam or joint 29. A ring-shaped gasket 30 is secured within a crimped channel 32 formed in the base plate 26 and is adapted to provide an oil-tight seal for an oil inlet chamber formed when the filter 10 is operatively mounted on a flat surface of the engine's filter mount (not shown). The reinforcing plate 20 is provided with an upwardly extending, internally threaded sleeve or neck portion 36 that defines the outlet passage 22 and which is adapted to threadably engage a standpipe (not shown) on the filter mount to operatively secure the filter 10 thereto.

An annular valve support sleeve or stool 38 is seated on plate 20 around the neck 36. The stool 38 has a cylindrical portion 40 that is coaxial with the neck 36 and a lower end portion that includes a perforated inner conical section 42 and an outer (preferably imperforate) conical section 43 which terminates above the reinforcing plate 20. The conical section 43 serves as a support surface for an intermediate diameter portion of an annular flexible valve disc 44 which is preferably constructed of a resilient oil resistant material such as synthetic rubber. It is preferably flat in unassembled condition. A conical surface 43a formed on the lower end of the filter element 14 bears against the top of the valve disc 44 and holds it in fluid tight contact with the section 43. The length of the filter medium 11 is such with respect to the internal height of the housing 16 and the axial position of the conical section 43 that the disc 44 is compressed with sufficient axial force to form a liquid-tight seal to prevent any oil from flowing across the section 43 or the surface 43a. Alternatively, spring means at the top end of the filter as conventionally found in filters of this type may be used to apply sealing pressure to disc 44.

The outer peripheral portion of the disc 44 resiliently bears with some pressure against the top of the reinforcing plate 20, as seen at 46. The inner diameter of the disc 44 is smaller than the diameter of the support stool's cylindrical portion 40 so that when the disc 44 is stretched around the cylindrical portion 40, the inner periphery of the disc 44 will be radially enlarged and circumferentially stretched around the cylindrical portion 40, as seen at 48. Preferably the inner and outer peripheral portions of the valve disc 44 engage the reinforcing plate 20 and the support stool's cylindrical portion 40 with substantial areas of surface contact as shown.

It will be observed that the disc 44 acts in combination with the reinforcing plate 20 and the lower end of the support stool 38 to define an inlet chamber 50 into which oil flows from the inlet ports 24. During normal conditions the oil will flow under the outer peripheral portion 46 of the disc 44 and into an annular chamber 52 between the side wall of the filter housing 16 and the outer periphery of the filtering medium 11. From there the oil passes radially inward through the filter medium 11 and into a central chamber 54 and from there it flows downward through a central aperture 56 in the stool 38 and through the outlet passage 22. The lip 46 acts as a check or anti-drainback valve to prevent back flow of oil from chamber 52 into chamber 50 and thus back into the engine.

In the event that the resistance to oil flow through the filter element 11 exceeds that of the inner periphery 48 of valve 44, the oil in chamber 50 will flow through the perforations in the valve stool's conical section 42 and unseat lip 48 from the cylindrical portion 40 allowing the oil to pass directly without filtration into the central chamber 54. From there it passes downwardly through the aperture 56 and the outlet passage 22 to the engine's lubrication system.

The pressure at which lip 48 is to unseat to permit by-passing of oil around the filter is dictated by the engine designer. It can be obtained with the disc 44 by adjusting three controllable variables, viz., compound of the rubber, thickness of the disc, relative diameters of the stool 40 and the unstressed inner periphery of disc. The desired pop pressure can be readily achieved by properly specifying each of these features.

While other filter media 11 may be used, two filter elements 12 and 14, which are suitably bonded together in a fluid-tight joint 58, may be constructed of two different porosity filtering materials. Thus, the lowermost filter element 14 may be formed of a relatively low flow resistant, high porosity filtering material. The upper filter element 12 may be formed of a filtering material characterized by a higher flow resistant, or in other words, a lower porosity filtering material than that forming the filter element 14. With such a construction, when the oil to be filtered is relatively viscous, as is its condition upon cold engine starting, it will flow through the lower or more porous filter element 14 and thereby not subject the less porous element 12 to the force of the viscous oil being pumped through the filter 10. As the oil becomes less viscous, as upon continued circulation through the engine's lubrication system, it will more readily flow through the less porous filter element 12 where it will be effectively filtered as it passes through the relatively minute interstices therewithin.

Referring now to FIG. 3, an alternative embodiment of the filter in which the relief valve function has been omitted comprises a filter housing 100 enclosing a rigid filter element 102. The bottom or lower end portion of the filter housing 100 is provided with a base assembly, generally designated by the numeral 104, which includes an annular reinforcing plate 106 having an upwardly extending sleeve portion 108 defining an outlet passage 109, and a plurality of inlet ports 110. The plate 106 is supported within the housing 100 by an annular base plate 112 having an annular sealing gasket 114 secured to the lower side thereof, and which is connected to the housing 100 in a liquid tight roll seam 116. The reinforcing plate 106, together with the base plate 112 and the gasket 114, is preferably formed in an identical configuration as its analogous component in the afore-discussed filter 10.

An annular valve support stool 118, which includes a central portion 120 defining an annular passage 122 and which is provided with an outwardly inclined conical flange portion 123, is mounted upon and extends axially upwardly from the reinforcing plate's sleeve portion 108. The flange portion 123 corresponds in size and location to the outer conical portion 43 of the support stool 38 so that the stool 38 and the stool 118 may be used interchangeably. A flexible annular valve disc 124 (corresponding to disc 44) is disposed around the valve stool's central portion 120 and is supported in fluid tight contact with the conical portion 123 by an axially compressive force exerted by a conical surface 126 on the filter element 102. The outer periphery 128 of the disc 124 engages the plate 106 with some pressure as shown.

In operation, oil to be filtered is pumped through the inlet ports 110 and into an annular chamber 127 defined by the support stool 118, the valve disc 124 and the reinforcing plate 106. The oil then flows between the outer peripheral lip 128 of the valve disc 124 and the reinforcing plate 106 and into an annular chamber 130 between the side walls of the housing 100 and the outer periphery of the filter element 102. The oil then flows radially inward through the filter element 102 into an interior chamber 132 defined thereby and thereafter it flows downward through the annular passageway 122 defined by the support stool 118 and through the outlet passage 109 where it is returned to the lubrication system of the engine through a filter mount standpipe (not shown). In the event that the inlet pressure drops to a preselected level, the valve disc 124 will operate as an anti-drain means to preclude the unfiltered oil from flowing out of the chamber 130 through the inlet ports 110, in an identical manner to the functioning of the outer peripheral portion 46 of the valve 44.

While it will be apparent that the preferred embodiments herein illustrated are well calculated to fulfill the objects above stated, it will be appreciated that modifications may be made without departing from the spirit and scope of the invention.

What is claimed is:

1. In a fluid filter, a fluid tight housing, a tubular filter member of the outside-in flow type in said housing and having an axis and an end face, a wall closing one end of the housing and having a fluid inlet and a fluid outlet therethrough, an axially extending sleeve at least partly confined between said filter member and said end wall, said sleeve providing an outlet passage for fluid connected to said fluid outlet, said sleeve including a laterally extending annular flange that is tapered with respect to said end wall and the axis of said filter member and provides a conical seat disposed axially in line with the end face of said filter member, said end face having a conical portion aligned with said conical seat, a single elastic valve member formed of rubber-like material, said valve member being annular and flat and of uniform thickness throughout when in unstressed condition, said valve member having an annular portion engaging said conical seat, said conical portion of said filter member end face engaging said valve member annular portion, said annular flange supporting said filter member in axially spaced relation to said end wall and said valve member annular portion sealing the conical portion and conical seat against fluid flow, said valve member having an annular outer peripheral portion yieldably engaging said end wall outwardly of said fluid inlet and acting as an antidrain back valve means to prevent back flow of fluid from inside the housing into said fluid inlet, said outer peripheral portion yielding under predetermined fluid pressure in the fluid inlet to move away from said end wall and permit fluid to enter said housing.

2. In a fluid filter, a fluid tight housing, a tubular filter member of the outside-in flow type in said housing and having an axis and an end face, a wall closing one end of the housing and having a fluid inlet and a fluid outlet therethrough, an axially extending sleeve at least partly confined between said filter member and said end wall, said sleeve providing an outlet passage for fluid connected to said fluid outlet, said sleeve including a laterally extending annular flange that is tapered with respect to said end wall and the axis of said filter member and provides a conical seat disposed axially in line with the end face of said filter member, said end face having a conical portion aligned with said conical seat, a single elastic valve member formed of rubber-like material, said valve member being annular and flat and of uniform thickness throughout when in unstressed condition, said valve member having an annular portion engaging said conical seat, said conical portion of said filter member end face engaging said valve member annular portion, said annular flange supporting said filter member in axially spaced relation to said end wall and said valve member annular portion sealing the conical portion and conical seat against fluid flow, said sleeve having a tubular portion forming said outlet passage and said valve member having an inner peripheral portion stretched over said tubular portion and having a tubular section concentric with the tubular portion, said flange having a by-pass opening located between said conical seat and tubular portion, said tubular section of the valve member acting to prevent by-pass flow to said outlet passage until fluid pressure exceeds the elastic pressure between the tubular section and tubular portion.

3. In a fluid filter, a fluid tight housing, a tubular filter member of the outside-in fluid type in said housing and having an axis and an end face, a wall closing one end of the housing and having a fluid inlet and a central fluid outlet, an axially extending sleeve having a tubular portion around said fluid outlet and providing an outlet passage, said sleeve having an annular filter member support flange located between said end face and said end wall, a single elastic valve member formed of rubber-like material, said valve member being annular and flat in unstressed condition, said valve member having inner and outer annular peripheral portions and a central annular portion located between said peripheral portions, said central portion being clamped against said annular flange by said end face, the inner peripheral portion of said valve member being stretched over said tubular portion and engaging it with elastic pressure and the outer peripheral portion of said valve member engaging said end wall outwardly of said fluid inlet with substantially less elastic pressure, said peripheral portions yielding to permit fluid flow when the pressure of fluid confined between the valve member and the end wall exceeds the respective elastic pressures applied by them.

4. A filter as set forth in claim 3 wherein said filter member comprises a rigid porous filter medium and all force clamping the valve member to the flange passes through said medium.

5. In a fluid filter, a fluid tight housing, a tubular filter member of the outside-in flow type in said housing and having an axis and an end face, a wall closing one end of the housing and having a fluid inlet and a fluid outlet therethrough, an axially extending sleeve at least partly confined between said filter member and said end wall, said sleeve providing an outlet passage for fluid connected to said fluid outlet, said sleeve including a laterally extending annular flange that is tapered with respect to said end wall and the axis of said filter member and provides a conical seat disposed axially in line with the end face of said filter member, said end face having a conical portion aligned with said conical seat, a single elastic valve member formed of rubber-like material, said valve member being annular and flat in unstressed condition, said valve member having an annular portion engaging said conical seat, said conical portion of said filter member end face engaging said valve member annular portion, said annular flange supporting said filter member in axially spaced relation to said end wall and said valve member annular portion sealing the conical portion and conical seat against fluid flow, said valve member having an annular outer peripheral portion yieldably engaging said end wall outwardly of said fluid inlet and acting as an antidrain back valve means to prevent back flow to fluid from inside the housing into said fluid inlet, said outer peripheral portion yielding under predetermined fluid pressure in the fluid inlet to move away from said end wall and permit fluid to enter said housing, said sleeve having a tubular portion forming said outlet passage and said flange having a by-pass opening located laterally inwardly of said conical seat and outwardly of said tubular portion, said valve member having an inner peripheral portion which when unstressed has a diameter substantially smaller than the diameter of said tubular portion, said valve member inner portion being stretched over said tubular portion and acting to prevent by-pass flow from said fluid inlet and by-pass opening to said outlet passage, said valve member inner portion yielding under predetermined fluid pressure to permit unfiltered fluid to by-pass the filter member and flow to said outlet passage, the elastic pressure between said inner peripheral valve portion and said tubular portion being substantially greater than the elastic pressure between said outer peripheral portion and said end wall so that said outer portion yields to permit fluid flow at substantially lower fluid pressures than does said inner peripheral portion.

6. In a fluid filter, a fluid tight housing, a tubular filter member of the outside-in flow type in said housing and having an axis and an end face, a wall closing one end of the housing and having a fluid inlet and a fluid outlet therethrough, an axially extending sleeve at least partly confined between said filter member and said end wall, said sleeve providing an outlet passage for fluid connected to said fluid outlet, said sleeve including a laterally extending annular flange that is tapered with respect to said end wall and the axis of said filter member and provides a conical seat disposed axially in line with the end face of said filter member, said end face having a conical portion aligned with said conical seat, a single elastic valve member formed of rubber-like material, said valve member being annular and flat in unstressed condition, said valve member having an annular portion engaging said conical seat, said conical portion of said filter member end face engaging said valve member annular portion, said annular flange supporting said filter member in axially spaced relation to said end wall and said valve member annular portion sealing the conical portion and conical seat against fluid flow, said valve member having an annular peripheral portion yieldably engaging said end wall outwardly of said fluid inlet and acting as an antidrain back valve means to prevent back flow of fluid from inside the housing into said fluid inlet, said outer peripheral portion yielding under predetermined fluid pressure in the fluid inlet to move away from said end wall and permit fluid to enter said housing, said filter member comprising a rigid porous filter medium and all force holding the valve member on the conical seat passing through said medium.

References Cited by the Examiner

UNITED STATES PATENTS

| 2,559,267 | 7/1951 | Winslow et al. | 210—484 X |
| 2,888,141 | 5/1959 | Coates et al. | 210—440 |
| 3,083,832 | 4/1963 | Hathaway et al. | 210—130 |
| 3,132,097 | 5/1964 | Tietz | 210—130 |
| 3,204,771 | 9/1965 | Baldwin | 210—443 |
| 3,231,089 | 1/1966 | Thornton | 210—136 X |

FOREIGN PATENTS

| 683,247 | 4/1964 | Canada. |
| 1,351,293 | 12/1963 | France. |

REUBEN FRIEDMAN, *Primary Examiner.*

F. SPEAR, *Assistant Examiner.*